(12) United States Patent
Nishiwaki et al.

(10) Patent No.: US 7,778,143 B2
(45) Date of Patent: Aug. 17, 2010

(54) OPTICAL DISK AND OPTICAL DISK APPARATUS

(75) Inventors: Seiji Nishiwaki, Kobe (JP); Hiroyuki Yamaguchi, Nishinomiya (JP); Hironori Deguchi, Hirakata (JP)

(73) Assignee: Panasonic Corporation, Osaka (JP)

( * ) Notice: Subject to any disclaimer, the term of this patent is extended or adjusted under 35 U.S.C. 154(b) by 961 days.

(21) Appl. No.: 11/106,683

(22) Filed: Aug. 25, 2005

(65) Prior Publication Data

US 2005/0286400 A1    Dec. 29, 2005

(30) Foreign Application Priority Data

Apr. 15, 2004   (JP) .............................. 2004-120141

(51) Int. Cl.
*G11B 7/24* (2006.01)

(52) U.S. Cl. .................................... 369/275.1

(58) Field of Classification Search ........................ None
See application file for complete search history.

(56) References Cited

U.S. PATENT DOCUMENTS

| 6,208,604 | B1 | 3/2001 | Ishibashi et al. | |
|---|---|---|---|---|
| 6,687,213 | B1 | 2/2004 | Takishita et al. | |
| 6,781,930 | B2 * | 8/2004 | Fukumoto | 369/44.32 |
| 6,965,555 | B2 * | 11/2005 | Ueki | 369/275.4 |
| 2005/0154682 | A1 * | 7/2005 | Taylor | 705/71 |
| 2005/0259561 | A1 * | 11/2005 | Nakamura et al. | 369/275.4 |

FOREIGN PATENT DOCUMENTS

| JP | 11-191220 A | 7/1999 |
|---|---|---|
| JP | 2000-222781 A | 8/2000 |
| JP | 2000-353321 A | 12/2000 |
| JP | 2001-357562 A | 12/2001 |
| JP | 2002-117547 A | 4/2002 |
| JP | 2002-260239 A | 9/2002 |

OTHER PUBLICATIONS

DVD Specifications for Recordable Disc of General (DVD-R for General), Part 1, Physical Specifications, Version 2.01 R 4.7, PH2-35-37 and PH4-1-5, Sep. 2002.

* cited by examiner

*Primary Examiner*—Joseph H Feild
*Assistant Examiner*—Henok G Heyi

(57) ABSTRACT

An optical disk according to the present invention includes: a substrate in a disk shape; guide grooves arranged at a pitch p in a radial direction of the substrate, each of the guide grooves being formed so as to extend in a circumferential direction of the substrate; and a pre-pit formed in a space between the guide grooves so as to extend along the guide groove. The optical disk is configured so that an address signal assigned to each location on a signal surface is indicated by the arrangement of the pre-pit in accordance with a predetermined rule. The pre-pit is composed of a pair of pre-pits formed on respective sides of the guide groove. The pair of pre-pits are arranged so as to be displaced in the circumferential direction so that a distance between inner edges of the respective pre-pits in the circumferential direction is smaller than the pitch p of the guide grooves. An optical disk apparatus of the present invention detects light reflected from the optical disk configured as above, calculates a differential phase detection signal, and detects an address signal using the differential phase detection signal. According to this optical disk apparatus, an address signal can be read reliably even at a region where a recording mark is formed so as to lie over the address pre-pit.

9 Claims, 14 Drawing Sheets

OPTICAL DISK AND OPTICAL DISK APPARATUS

BACKGROUND OF THE INVENTION

1. Field of the Invention

The present invention relates to an optical disk used as a medium for recording information and also to an optical disk apparatus for recording/reproducing information on/from the optical disk.

2. Description of Related Art

As a conventional technique for detecting an address signal on a signal surface of an optical disk, the technique described in "DVD Specifications for DVD-R for General, Physical Specifications Version 2.0" is known, for example. This conventional technique will be described with reference to FIGS. 10A to 10D, FIG. 11, and FIG. 12, which schematically show this technique.

FIG. 10A shows the basic configuration of a conventional optical disk apparatus. FIG. 10B is a plan view showing the state where a light spot scans a signal surface of an optical disk. FIG. 10C is a plan view showing one form of a light spot detected on a photodetector. FIG. 10D is a plan view showing another form of a light spot detected on the photodetector.

In FIG. 10A, light emitted from a light source 1 passes through a beam splitter 2 and then is converted into parallel light by a collimator lens 3. Then, an objective lens 4 focuses the parallel light on an optical disk signal surface (hereinafter referred to simply as a "signal surface") 5S of an optical disk substrate 5, whereby the parallel light is focused into converging light 6. Light reflected by the signal surface 5S is converted into parallel light by the objective lens 4. The parallel light is converged by the collimator lens 3 and then reflected by a split surface 2a of the beam splitter 2 to be focused on a photodetector 7, whereby the parallel light is focused into converging light 8.

As shown in FIG. 10B, a focal spot 6S on the signal surface 5S is controlled so that it is positioned on one of guide grooves 5G, which are recessed portions formed periodically on the signal surface 5S, and scans the guide grooves 5G as the optical disk substrate 5 rotates. On the other hand, as shown in FIG. 10C, a detection surface of the photodetector 7 is divided into four photodetecting elements 7a, 7b, 7c, and 7d by parting lines 71 and 72 that are orthogonal to each other. Accordingly, a focal spot on the detection surface also is divided into four focal spots 8a, 8b, 8c, and 8d by the parting lines 71 and 72. The direction in which the parting line 71 extends corresponds to the direction in which the guide grooves 5G extend on the signal surface 5S. A tracking error signal (TE signal) that indicates an error in tracking the guide grooves 5G, a differential phase detection signal (DPD signal) that indicates an error in tracking a pit, a recording mark, or the like, and a reproduction signal (RF signal) are generated based on the following (Formula 1), (Formula 2), and (Formula 3), respectively, where 7A, 7B, 7C, and 7D represent detection signals detected at the photodetecting elements 7a, 7b, 7c, and 7d, respectively.

$$TE=(7A+7D)-(7B+7C) \quad \text{(Formula 1)}$$

$$DPD=(7A+7C)-(7B+7D) \quad \text{(Formula 2)}$$

$$RF=7A+7B+7C+7D \quad \text{(Formula 3)}$$

The optical disk apparatus may be configured so that a hologram 9 further is disposed between the beam splitter 2 and the photodetector 7. In this case, due to the diffraction by the hologram 9, the focal spot is divided into four focal spots as shown in FIG. 10D, namely, a focal spot 8a' that is formed within the photodetecting element 7a, a focal spot 8b' that is formed within the photodetecting element 7b, a focal spot 8c' that is formed within the photodetecting element 7c, and a focal spot 8d' that is formed within the photodetecting element 7d.

In the conventional optical disk apparatus, an address signal of the optical disk is detected based on the TE signal regardless of the presence or absence of the hologram 9.

FIG. 11 is a plan view showing the shape of an address signal pre-pit 5A of a conventional optical disk. In FIG. 11, a portion between each pair of adjacent guide grooves 5G is a land portion 5L. The address signal pre-pit 5A has the same height as the guide groove 5G and protrudes from the guide groove 5G toward the region of the land portion 5L on one side, with the amount of protrusion being "a" and the length of the protruding portion being "b". The amount of protrusion "a" is a distance measured from the center line GC of the guide groove 5G, and the length "b" of the protruding portion is a distance along the direction of the guide groove 5G. An address assigned to each location on the signal surface 5S is indicated by the arrangement of the pre-pit 5A on the signal surface 5S in accordance with a predetermined rule. When the focal spot 6S scans the guide grooves 5G, the TE signal is affected by the presence of the address signal pre-pit 5A.

An example thereof is shown in FIG. 12. FIG. 12 shows a TE signal waveform 10a and a DPD signal waveform 11a obtained at a portion around the address signal pre-pit 5A when reproduction is performed with respect to an unrecorded region. In FIG. 12, the horizontal axis represents a position (μm) in the length direction of the guide groove 5G and the vertical axis represents an amount of signal (%). Note here that FIG. 12 is directed to an example in which the measurement conditions are as follows: the light source 1 has a wavelength λ of 0.66 μm, the objective lens 4 has a NA of 0.62, the guide grooves 5G are arranged at a pitch p of 0.74 μm, the guide grooves 5G and the pre-pit 5A have an optical depth d of 7 p/72, the guide grooves 5G have a width w of 0.30 μm, the amount of protrusion "a" is 0.23 μm, and the length "b" of the protruding portion is 4T, where T represents a length corresponding to a clock frequency and is set to 0.133 μm. As shown in FIG. 12, a large amplitude is caused in the TE signal waveform 10a by the address signal pre-pit 5A. By detecting this amplitude waveform through the comparison with a predetermined slice level, it is possible to detect an address signal. It is to be noted here that, as shown in FIG. 12, the DPD signal waveform 11a is not affected by the pre-pit 5A and thus shows substantially no amplitude.

In the conventional optical disk and optical disk apparatus as described above, there has been a problem as follows. That is, changes in the TE signal waveform and the DPD signal waveform obtained at a portion around the address signal pre-pit 5A when reproduction is performed with respect to a recorded region are perceived as a problem. FIG. 13 shows a TE signal waveform 10b and a DPD signal waveform 11b obtained at a portion around the address signal pre-pit 5A in a recorded state. FIG. 13 shows the state where the optical depth d of the guide groove 5G and the pre-pit 5A becomes p/4 by recording. As clear from FIG. 13, the TE signal waveform 10b obtained after recording has substantially no amplitude regardless of the presence of the pre-pit 5A, so that it is not possible to detect the amplitude waveform.

This phenomenon can be explained as follows with reference to FIG. 14. FIG. 14 shows the relationship between a detection signal amplitude and an optical depth of the guide groove 5G and the pre-pit 5A in an optical disk of a disk format such as DVD-R or DVD-RW. In FIG. 14, the horizontal axis represents an optical depth ($\lambda/720$) and the vertical axis represents amplitude (%) of a detection signal. Note here that the measurement conditions are as follows: the light source 1 has a wavelength $\lambda$ of 0.66 μm, the objective lens 4 has a NA of 0.62, the guide grooves 5G are arranged at a pitch p of 0.74 μm, and the guide grooves 5G have a width w of 0.30 μm. A TE signal amplitude 12 denotes the value of the total amplitude detected when the focal spot 6S traverses the guide groove 5G. A RF signal amplitude 13 denotes the value of signal amplitude detected when a 3T continuous recording signal in an isolated track is reproduced. A DPD signal amplitude 14 denotes the value of signal amplitude detected when a 4T continuous phase pit signal is reproduced with an amount of off-track being 0.1 μm.

As shown in FIG. 14, the TE signal amplitude 12 reaches its maximum when the optical depth d is p/8 and its minimum (zero) when the optical depth d is p/4. On the other hand, the RF signal amplitude 13 and the DPD signal amplitude 14 reach their maximum when the optical depth d is p/4. In the optical disk of a disk format such as DVD-R or DVD-RW, the guide groove 5G in an unrecorded state has an optical depth d of about $\lambda/20$ to $\lambda/10$, and a signal mark formed by recording serves as a phase pit having an optical depth d of about $\lambda/8$ to $\lambda/5$. Accordingly, when combined with the guide groove 5G that is originally present on the optical disk, the recording mark has an optical depth d in the vicinity of p/4, thereby allowing the RF signal amplitude to reach its maximum. On the other hand, when the recording mark is formed so as to lie over the pre-pit 5A, the pre-pit 5A causes no amplitude in the TE signal, so that the reading of an address signal after recording (also during recording) becomes impossible. In particular, in the case of high-speed recording in an optical disk of a disk format such as DVD-R, the recording mark is liable to expand, which may cause the recording mark to cover the pre-pit 5A entirely, thereby further inhibiting the generation of amplitude in the TE signal.

SUMMARY OF THE INVENTION

Therefore, with the foregoing in mind, it is an object of the present invention to provide an optical disk and an optical disk apparatus by which an address signal can be read reliably even at a region where a recording mark is formed so as to lie over an address pre-pit after recording, not to mention before recording.

An optical disk according to a first configuration of the present invention includes: a substrate in a disk shape; guide grooves arranged at a pitch p in a radial direction of the substrate, each of the guide grooves being formed so as to extend in a circumferential direction of the substrate; and a pre-pit formed in a space between the guide grooves so as to extend along the guide groove. The optical disk is configured so that an address signal assigned to each location on a signal surface is indicated by the arrangement of the pre-pit in accordance with a predetermined rule. In this optical disk, the pre-pit is composed of a pair of pre-pits formed on respective sides of the guide groove. The pair of pre-pits are arranged so as to be displaced in the circumferential direction so that a distance between inner edges of the respective pre-pits in the circumferential direction is smaller than the pitch p of the guide grooves.

Furthermore, an optical disk according to a second configuration of the present invention includes: a substrate in a disk shape; guide grooves arranged at a pitch p in a radial direction of the substrate, each of the guide grooves being formed so as to extend in a circumferential direction of the substrate; and a pre-pit formed in a space between the guide grooves so as to extend along the guide groove. The optical disk is configured so that an address signal assigned to each location on a recording surface is indicated by the arrangement of the pre-pit in accordance with a predetermined rule. In this optical disk, a groove eliminated region in which the guide groove is discontinued is formed in a part of a region where the pre-pit is formed.

An optical disk apparatus according to the present invention basically is configured so that it includes: a light source; a photodetector having a plurality of light-receiving elements; an optical system for focusing a light beam emitted from the light source on an optical disk and focusing reflected light from the optical disk on the photodetector; a focus control unit for performing focus control with respect to the light beam based on an output from the photodetector; a tracking control unit for performing tracking control with respect to the light beam based on the output from the photodetector; and an address detection unit for detecting an address signal assigned to each location on a signal surface of the optical disk in the output from the photodetector. In this optical disk apparatus, an optical disk having either one of the above-described configurations is loaded, and the address detection unit detects the address signal in the output from the photodetector that is based on the pre-pit formed on the optical disk.

In an optical disk apparatus according to a first configuration of the present invention, assuming that four regions A, B, C, and D are defined by straight lines that respectively extend in a radial direction and a circumferential direction of the optical disk and are arranged clockwise in this order with the straight line between the regions A and B extending in the circumferential direction, light beams reflected from the regions A, B, C, and D of the optical disk are projected on the plurality of light-receiving elements of the photodetector separately, thereby generating detection signals a, b, c, and d, respectively, and a DPD signal given by $\{(a+c)-(b+d)\}$ is used to detect the address signal.

Furthermore, in an optical disk apparatus according to a second configuration of the present invention, assuming that four regions A, B, C, and D are defined by straight lines that respectively extend in a radial direction and a circumferential direction of the optical disk and are arranged clockwise in this order with the straight line between the regions A and B extending in the circumferential direction, light beams reflected from the regions A, B, C, and D of the optical disk are projected on the plurality of light-receiving elements of the photodetector separately, thereby generating detection signals a, b, c, and d, respectively, and one of a TE signal given by $\{(a+d)-(b+c)\}$ and a DPD signal given by $\{(a+c)-(b+d)\}$ is selected depending on a detection situation and is used to detect the address signal.

Still further, in an optical disk apparatus according to a third configuration of the present invention, assuming that four regions A, B, C, and D are defined by straight lines that respectively extend in a radial direction and a circumferential direction of the optical disk and are arranged clockwise in this order with the straight line between the regions A and B extending in the circumferential direction, light beams reflected from the regions A, B, C, and D of the optical disk are projected on the plurality of light-receiving elements of the photodetector separately, thereby generating detection signals a, b, c, and d, respectively, and one of a TE signal given by $\{(a+d)-(b+c)\}$, a DPD signal given by $\{(a+c)-(b+d)\}$, and a 2ch-DPD signal given by (a−b) or (c−d) is selected depending on a detection situation and is used to detect the address signal.

DETAILED DESCRIPTION OF THE INVENTION

According to an optical disk of the present invention configured as above, the DPD signal has a large amplitude in an unrecorded state and it tends to be increased further by recording. Accordingly, by detecting an address signal based on the DPD signal alone or in combination with the TE signal, an error in reading an address signal can be inhibited even after recording, not to mention before recording.

Furthermore, the TE signal waveform obtained at the address signal pre-pit is the same as that obtained in a conventional example. Therefore, if the pre-pits of the optical disk of the present invention are formed at the same positions as those in a conventional optical disk, the optical disk of the present invention also can be used in a conventional optical disk apparatus. This allows the optical disk of the present embodiment to have compatibility with an existing drive.

In the optical disk according to the first configuration, an order in which one of the pair of pre-pits provided on one side of the guide groove and the other pre-pit provided on the other side of the guide groove are arranged in the circumferential direction can form a part of the information of the address signal.

In the optical disk according to the second configuration, it is preferable that an eliminated width that is a length of the groove eliminated region in the circumferential direction is at least 0.5 p.

The optical disk apparatus according to the second configuration may be configured so that, when the optical disk is in an unrecorded state, the TE signal is used to detect the address signal, and when the optical disk is in a recorded state, a signal having a better signal quality is selected from the TE signal and the DPD signal and is used to detect the address signal.

The optical disk apparatus according to the third configuration may be configured so that, when the optical disk is in an unrecorded state, the TE signal is used to detect the address signal, and when the optical disk is in a recorded state, a signal having the best signal quality is selected from the TE signal, the DPD signal, and the 2ch-DPD signal and is used to detect the address signal.

Hereinafter, the present invention will be described by way of embodiments with reference to the drawings.

First Embodiment

Figure 10A:
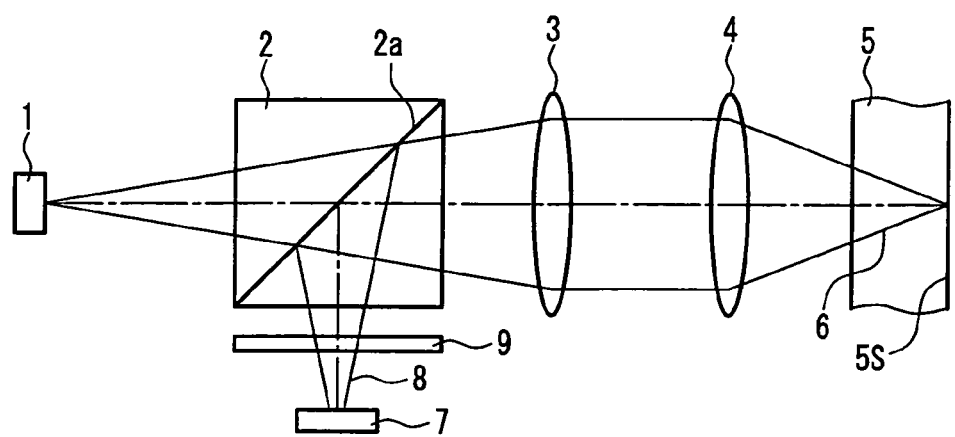
FIG. 10A shows the basic configuration of optical disk apparatuses according to a conventional example and embodiments of the present invention.
Figure 10B:
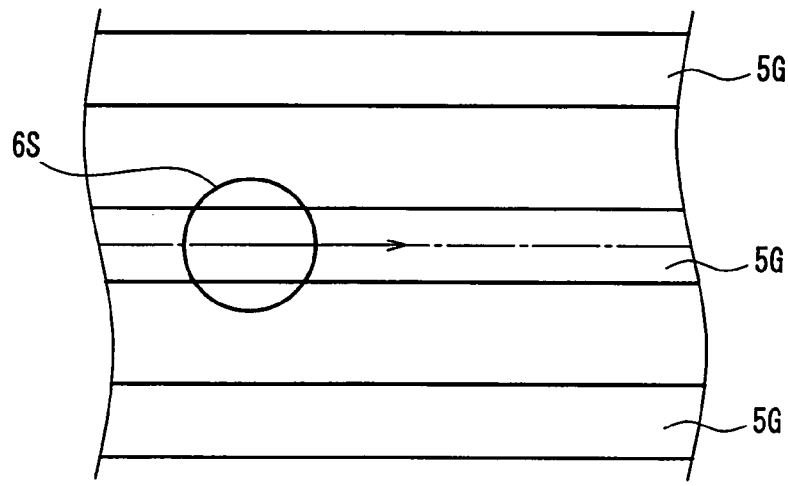
FIG. 10B is a plan view showing the state where a light spot scans an optical disk signal surface.
Figure 10C:
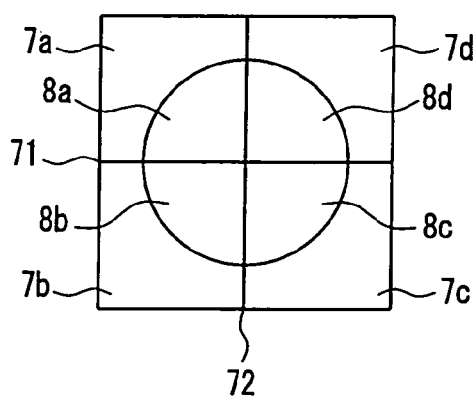
FIG. 10C is a plan view showing one form of a light spot detected on a photodetector.
Figure 10D:
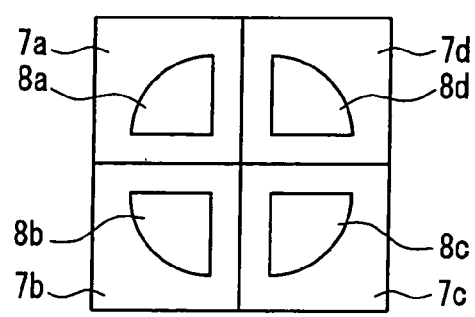
FIG. 10D is a plan view showing another form of a light spot detected on the photodetector.

A first embodiment of the present invention will be described with reference to FIGS. 1 to 4. The basic configuration of an optical disk apparatus according to the present embodiment is the same as that of the conventional optical disk apparatus shown in FIG. 10A. Also, the state where a light spot scans a signal surface of an optical disk is the same as that shown in FIG. 10B, and the form of a light spot detected on a photodetector is the same as that shown in FIG. 10C. Therefore, the following description is made with reference to these drawings. The elements identical to those used in the conventional example are described using the same reference numerals and duplicate explanations will be omitted.

In the present embodiment, a DPD signal is used to detect an address signal of an optical disk regardless of the presence or absence of a hologram 9.

Figure 1A:
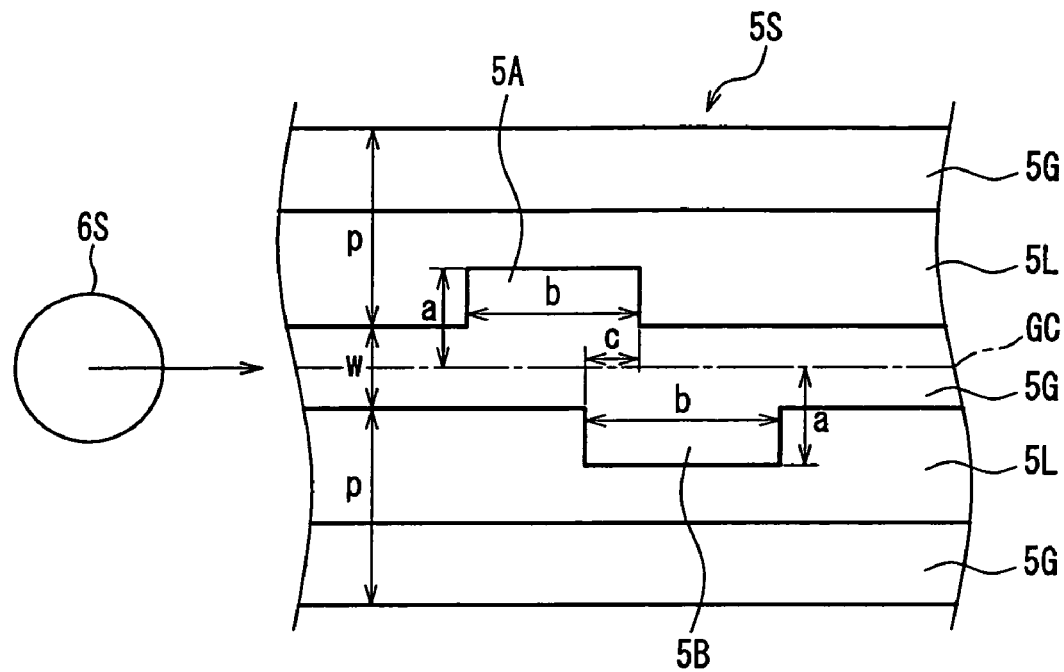
FIG. 1A is a plan view showing the shape of an address signal pre-pit of an optical disk according to a first embodiment of the present invention.
Figure 1B:
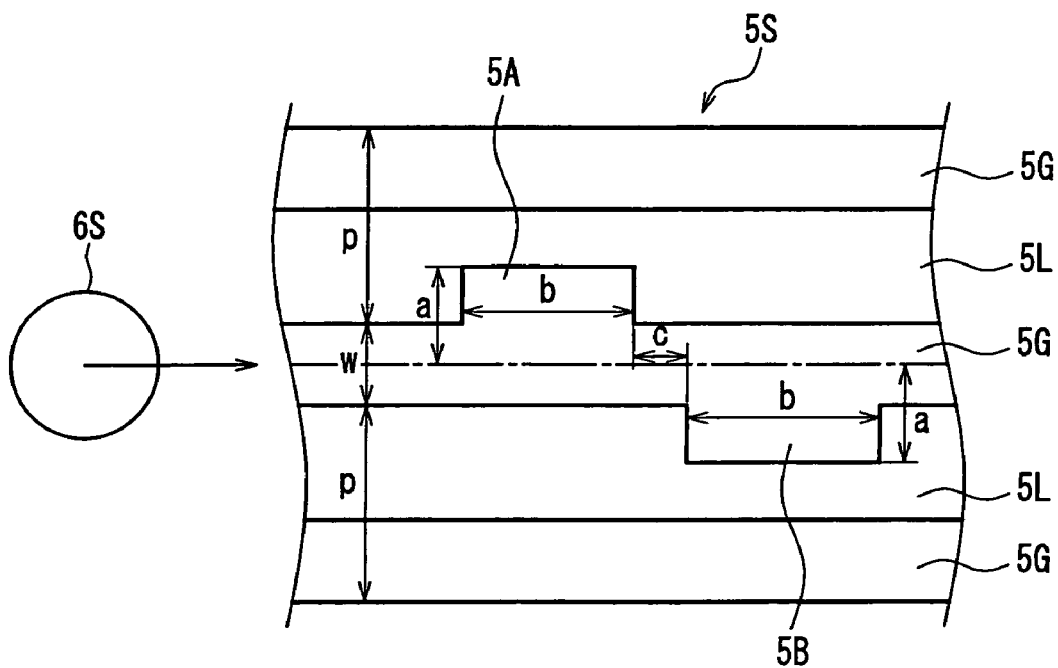
FIG. 1B is a plan view showing another shape of an address signal pre-pit of the optical disk according to the first embodiment.

FIG. 1A and FIG. 1B are plan views showing shapes of an address signal pre-pit of the optical disk according to the present embodiment. In the present embodiment, one unit of pre-pit arranged with respect to a guide groove 5G is composed of a pair of address signal pre-pits 5A and 5B. One of the pair of address signal pre-pits, namely, the address signal pre-pit 5A, has the same height as the guide groove 5G and protrudes from the guide groove 5G toward the region of the land portion 5L on one side, with the amount of protrusion measured from the center line GC of the guide groove 5G being "a" and the length of the protruding portion being "b". The other address signal pre-pit, namely, the address signal pre-pit 5B, has the same height as the guide groove 5G and protrudes from the guide groove 5G toward the region of the land portion 5L on the other side, with the amount of protrusion measured from the center line GC of the guide groove 5G being "a" and the length of the protruding portion being "b". These pre-pits 5A and 5B are arranged so as to be displaced in the direction of the guide groove 5G. More specifically, the pre-pit 5A and the pre-pit 5B may overlap each other by the edge-to-edge distance c as shown in FIG. 1A, or alternatively, the pre-pit 5A and the pre-pit 5B may be apart from each other by the edge-to-edge distance c as shown in FIG. 1B. Either of the configurations is applicable. Note here that the edge-to-edge distance c is defined as a distance between the inner edge of the pre-pits 5A and the inner edge of the pre-pits 5B in the direction of the guide groove 5G.

The amplitude of a DPD signal is pertinent to the edge-to-edge distance c and reaches its maximum when the edge-to-edge distance c is smaller than the pitch p of the guide grooves 5G, e.g., when the edge-to-edge distance c is about 0.133 µm in the example shown in FIG. 1A. In the present embodiment, by arranging the combination of the pre-pits 5A and 5B on a signal surface of the optical disk in accordance with a predetermined rule, an address is assigned to the signal surface. When a focal spot 6S scans the guide grooves 5G, the DPD signal is affected by the presence of the address signal pre-pits 5A and 5B.

Figure 2:
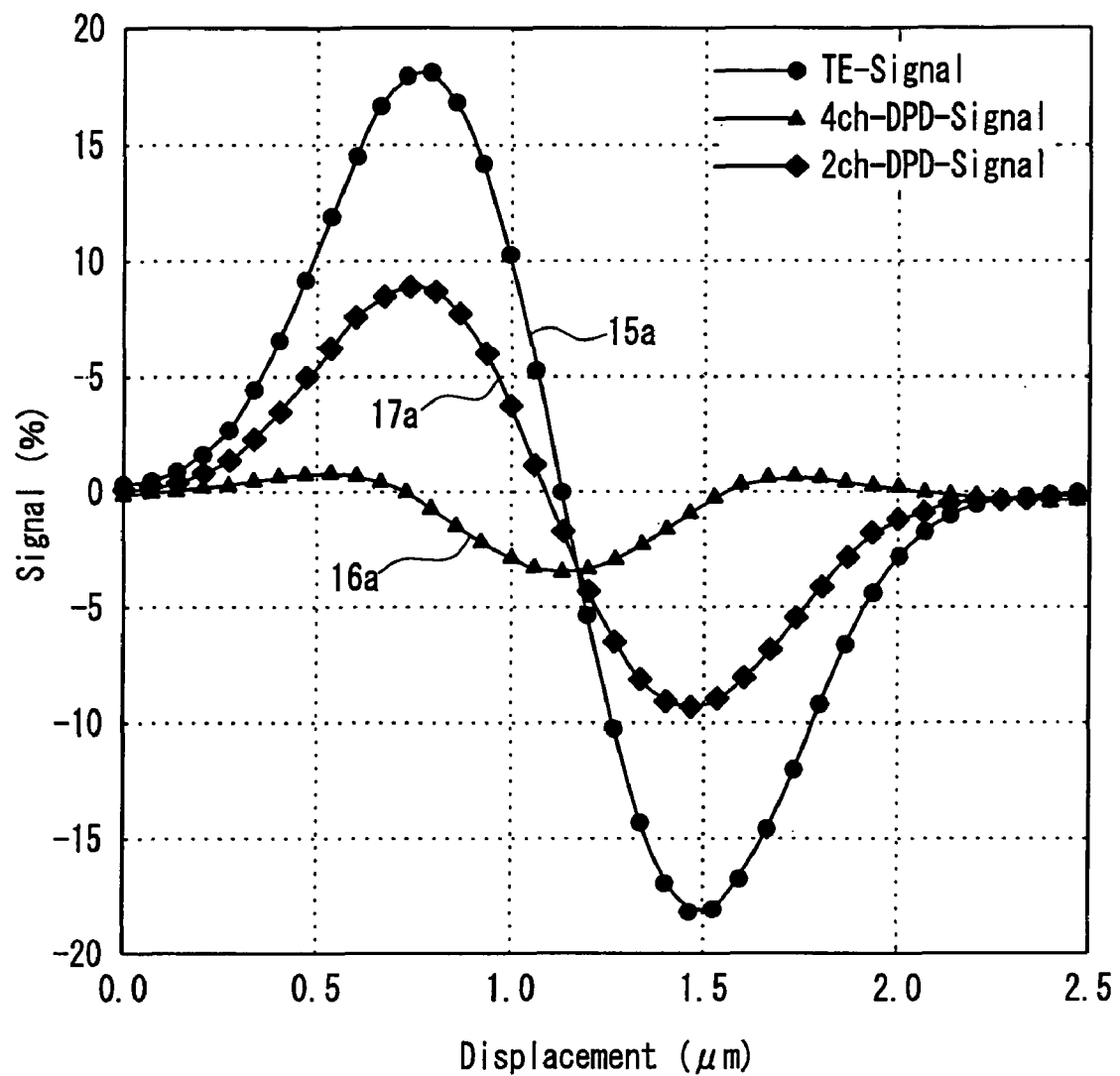
FIG. 2 shows an example of a DPD signal waveform, a 2ch-DPD signal waveform, and a TE signal waveform obtained when reproduction is performed with respect to a portion around an address signal pre-pit in an unrecorded region of the optical disk according to the first embodiment.

An example thereof is shown in FIG. 2. FIG. 2 shows a TE signal waveform 15a and a DPD signal waveform 16a obtained when reproduction is performed with respect to a portion around the address signal pre-pit in an unrecorded region. Note here that FIG. 2 is directed to an example where the address signal pre-pit is composed of the address signal pre-pits 5A and 5B shown in FIG. 1A. In the example shown in FIG. 2, the measurement conditions are set as follows: the light source 1 has a wavelength λ of 0.66 µm, the objective lens 4 has a NA of 0.62, the guide groove 5G and the pre-pits 5A and 5B have an optical depth d of 7λ/72, the guide grooves 5G are arranged at a pitch p of 0.74 µm, the guide grooves 5G have a width w of 0.30 µm, the amount of protrusion "a" is 0.37 µm, the length "b" of the protruding portion is 5T, and the edge-to-edge distance c is T. Note here that T corresponds to a clock frequency, which corresponds to 0.133 µm. As shown in FIG. 2, a large amplitude is caused in the DPD signal waveform 16a by the address signal pre-pits 5A and 5B. By detecting this amplitude waveform through the comparison with a predetermined slice level, it is possible to detect an address signal. Also, in the TE signal waveform 15a, large amplitudes are caused in the positive and negative directions by the influence of the pre-pits 5A and 5B.

Figure 3:
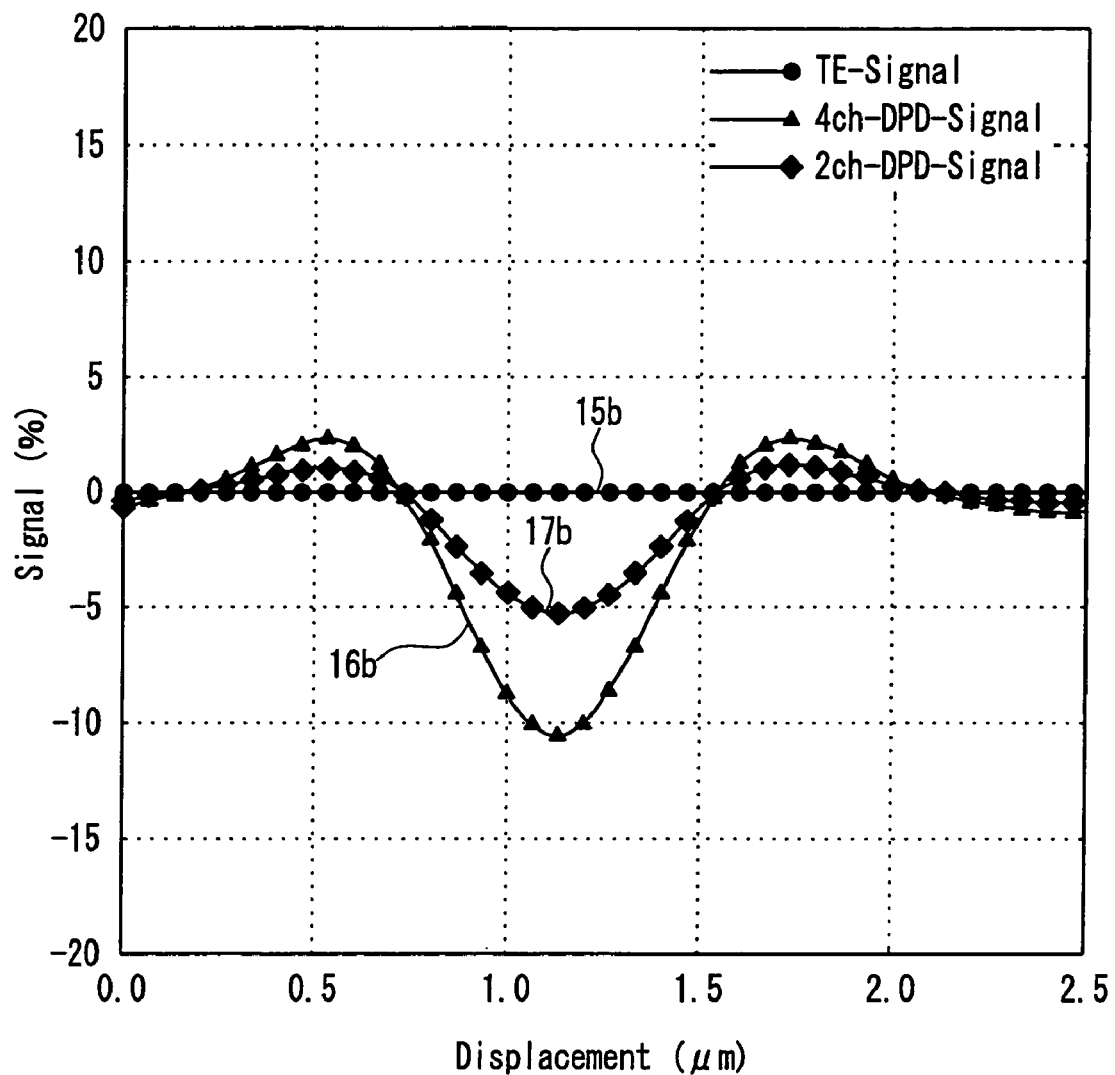
FIG. 3 shows an example of a DPD signal waveform, a 2ch-DPD signal waveform, and a TE signal waveform obtained when reproduction is performed with respect to a portion around an address signal pre-pit in a recorded region of the optical disk according to the first embodiment.

FIG. 3 shows a TE signal waveform 15b and a DPD signal waveform 16b obtained when reproduction is performed with respect to a portion around the address signal pre-pit in a recorded region. These waveforms correspond to those obtained when the optical depth d of the guide groove 5G and the address signal pre-pits 5A and 5B becomes p/4 by recording. As clear from FIG. 3, the TE signal waveform 15b obtained after recording has substantially no amplitude regardless of the presence of the pre-pits 5A and 5B, as in the case of the conventional example. In contrast, the DPD signal waveform 16b has a large amplitude, which in fact is larger than that obtained before recording. This phenomenon can be explained as follows with reference to FIG. 14.

Figure 14:
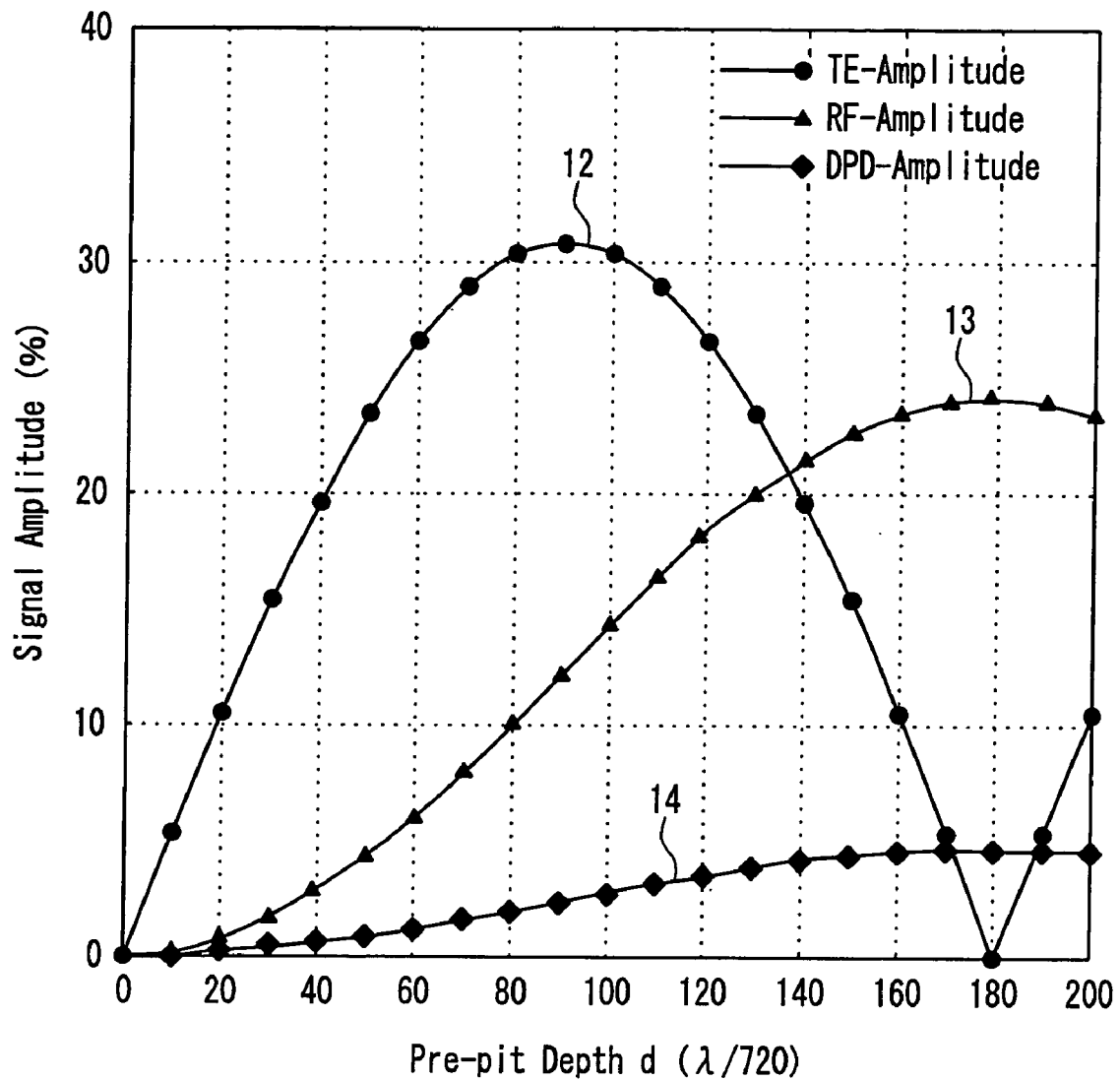
FIG. 14 shows the relationship between a detection signal amplitude and an optical depth of a guide groove and a pre-pit of an optical disk.

That is, as shown in FIG. 14, the TE signal amplitude 12 reaches its maximum when the optical depth d is λ/8 and its minimum (zero) when the optical depth d is λ/4. On the other hand, the RF signal amplitude 13 and the DPD signal amplitude 14 reach their maximum when the optical depth d is λ/4. In the optical disk of a disk format such as DVD-R or DVD-RW, the guide groove 5G has an optical depth d of about λ/20 to λ/10 in an unrecorded state, and a signal mark formed by recording serves as a phase pit having an optical depth d of about λ/8 to λ/5. Accordingly, when combined with the depth of the guide groove 5G that is originally present on the optical disk, the recording mark has an optical depth d in the vicinity of λ/4 so that the RF signal amplitude 13 reaches its maximum. At a portion where a recording mark is formed so as to lie over the pre-pits 5A and 5B, the TE signal amplitude 12 becomes zero, whereas the DPD signal amplitude 14 is increased to reach its maximum. At a portion where a recording mark is formed so as not to lie over the pre-pit 5A or 5B, the TE signal amplitude 12 and the DPD signal amplitude 14 are the same as those obtained in the unrecorded state. At a portion where a recording mark is formed so as to lie over the pre-pits 5A and 5B partially, the DPD signal amplitude 14 and the TE signal amplitude 12 are, as a matter of course, intermediate amplitudes between amplitudes obtained in the above-described two cases.

As described above, in the optical disk according to the present embodiment, the DPD signal waveform 16a has a large amplitude in the unrecorded state as shown in FIG. 2, and the amplitude of the DPD signal waveform 16b tends to be increased by recording as shown in FIG. 3. Accordingly, in the present embodiment, by detecting an address signal based on the DPD signal, the occurrence of an error in reading an address signal can be inhibited even after recording, not to mention before recording.

Figure 4:
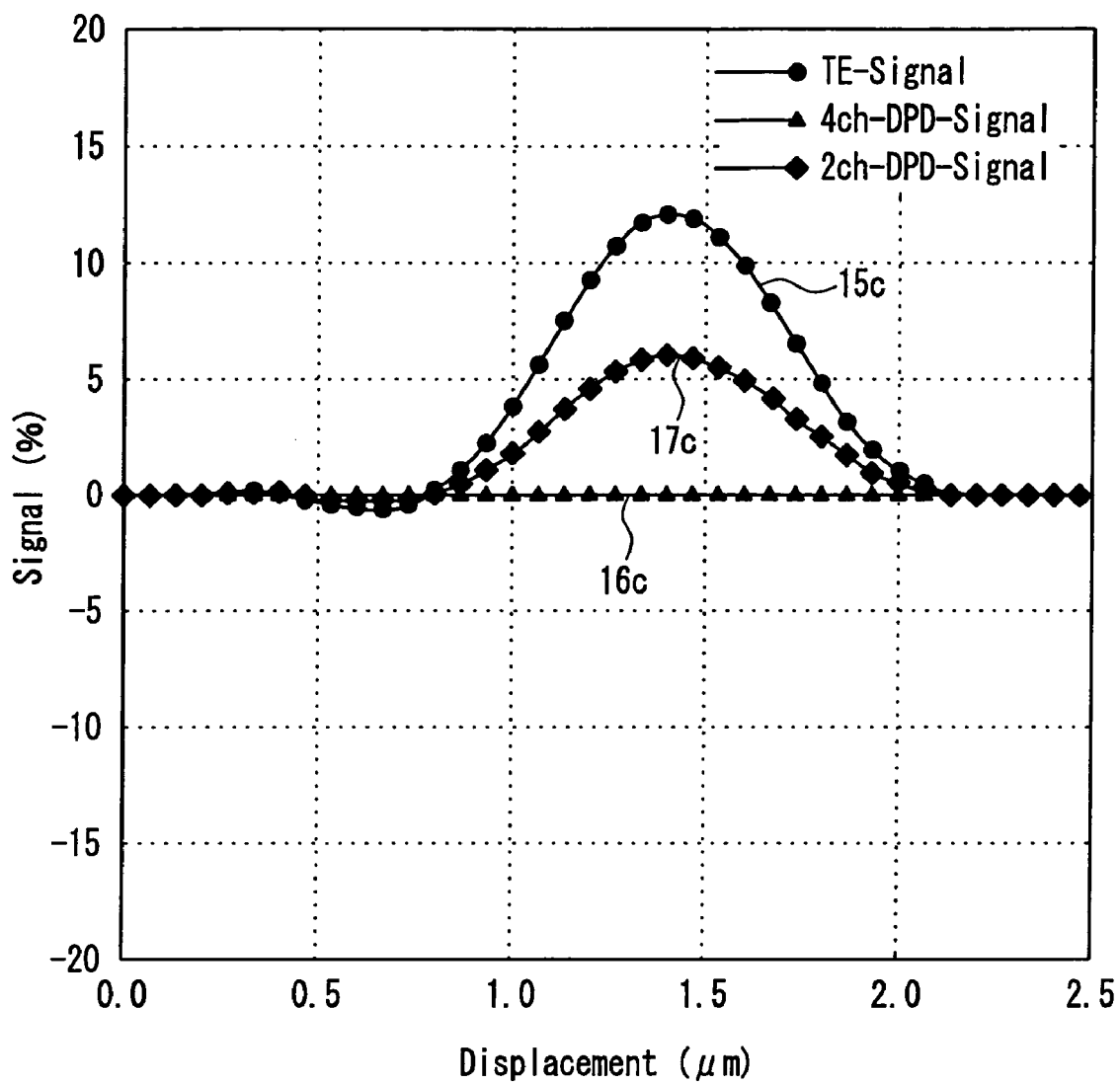
FIG. 4 shows an example of a DPD signal waveform, a 2ch-DPD signal waveform, and a TE signal waveform obtained when a portion around an address signal pre-pit in an unrecorded region of the optical disk according to the first embodiment is irradiated with a light spot that is irradiated for scanning an adjacent track.

Moreover, according to the configuration of the present embodiment, the following effect also can be obtained. FIG. 4 shows a TE signal waveform 15c and a DPD signal waveform 16c obtained when a portion around an address signal pre-pit in an unrecorded region is irradiated with a light spot that is irradiated for scanning an adjacent track. The TE signal waveform 15c has an amplitude, whereas the DPD signal waveform 16c has no amplitude. That is, according to a method in which an address signal is read using the DPD signal, a signal pre-pit provided in an adjacent track does not affect the detection of the address signal so that it is only necessary to specify the address signal pre-pit on the track being scanned correctly.

It is to be noted here that, instead of the above-described method in which an address signal of the optical disk is detected based on the DPD signals 16a and 16b, it is also possible to use the following method, which utilizes the fact that the TE signal 15a has a large amplitude before recording and that, even after recording, the TE signal 15b has a large amplitude when a recording mark is formed so as not to lie over the address signal pre-pit 5A or 5B. For example, the detection of an address signal can be carried out based on the TE signal 15a in an unrecorded region and based on the DPD signal 16*b* in a recorded region. Alternatively, the detection may be carried out using the TE signals 15*a* and 15*b* and the DPD signals 16*a* and 16*b* in both the unrecorded region and the recorded region and then the signals by which an address signal is detected may be selected.

In this case, instead of the TE signal or DPD signal, it is also possible to use a so-called two-channel DPD signal. More specifically, it is possible to use an arithmetic signal represented by (7A−7B) or (7D−7C), which is a DPD signal that performs detection using a semicircular light spot (8*a*, 8*b*) or (8*c*, 8*d*) instead of the circular light spot shown in FIG. 10C. In FIG. 2, the waveform of a two-channel DPD signal obtained in an unrecorded region is shown as a 2ch-DPD signal waveform 17*a*. In FIG. 3, the waveform of a two-channel DPD signal obtained in a recorded region is shown as a 2ch-DPD signal waveform 17*b*. As can be seen from FIG. 2, the 2ch-DPD signal waveform 17*a* obtained in the unrecorded region is similar to the TE signal waveform 15*a*. Furthermore, as can be seen from FIG. 3, the 2ch-DPD signal waveform 17*b* obtained in the recorded region is similar to the DPD signal waveform 15*b* (four-channel DPD signal). Moreover, as shown in FIG. 4, a 2ch-DPD signal waveform 17*c* obtained when an adjacent track is reproduced is similar to the TE signal waveform 15*c*. As described above, the TE signal, the 2ch-DPD signal, and the DPD signal have their own characteristics. Accordingly, it is possible to select any one of these signals depending on the situation and use the selected signal for the detection of an address signal.

Note here that the pre-pits' A and 5B may be arranged in the reverse order along the guide groove 5G. In this case, the DPD signal has a waveform with the reversed polarity. Thus, the interchanging of the arrangement order of the pre-pits 5A and 5B may be included in the information of an address signal.

Second Embodiment

Hereinafter, a second embodiment of the present invention will be described with reference to FIGS. 5 to 7. The elements identical to those used in the first embodiment are described using the same reference numerals. An optical disk apparatus of the present embodiment is identical to that of the first embodiment except that the shape of an address signal pre-pit of an optical disk is different, and thus duplicate explanations will be omitted here. In the present embodiment, a DPD signal is used to detect an address signal of an optical disk as in the first embodiment.

Figure 5:
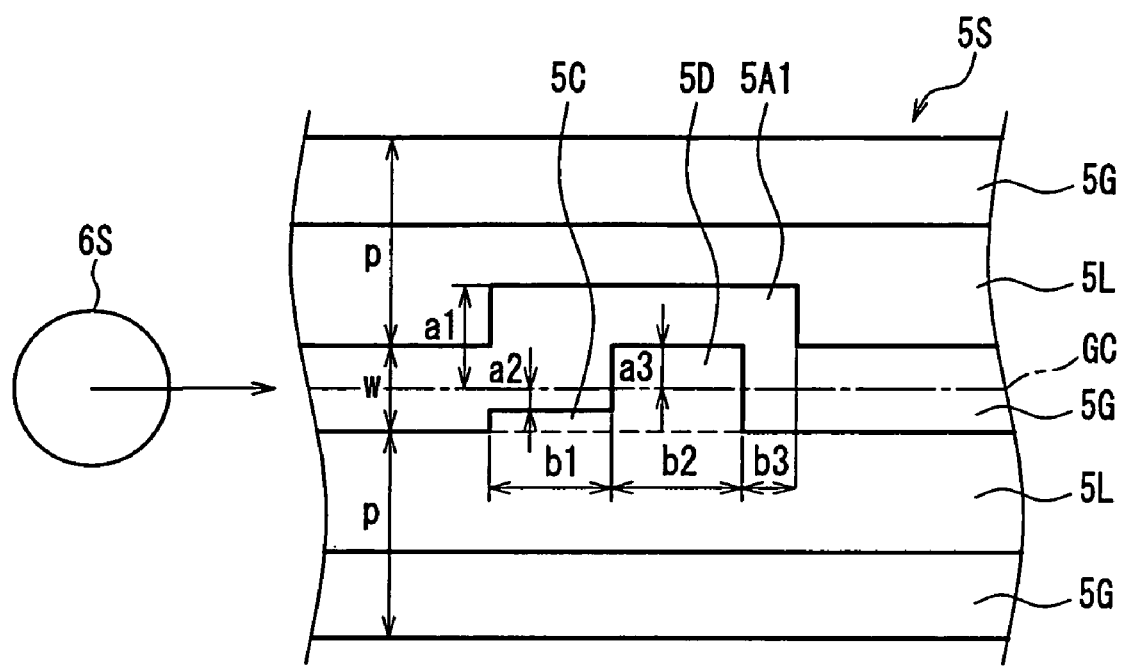
FIG. 5 is a plan view showing the shape of an address signal pre-pit of an optical disk according to a second embodiment of the present invention.
Figure 6:
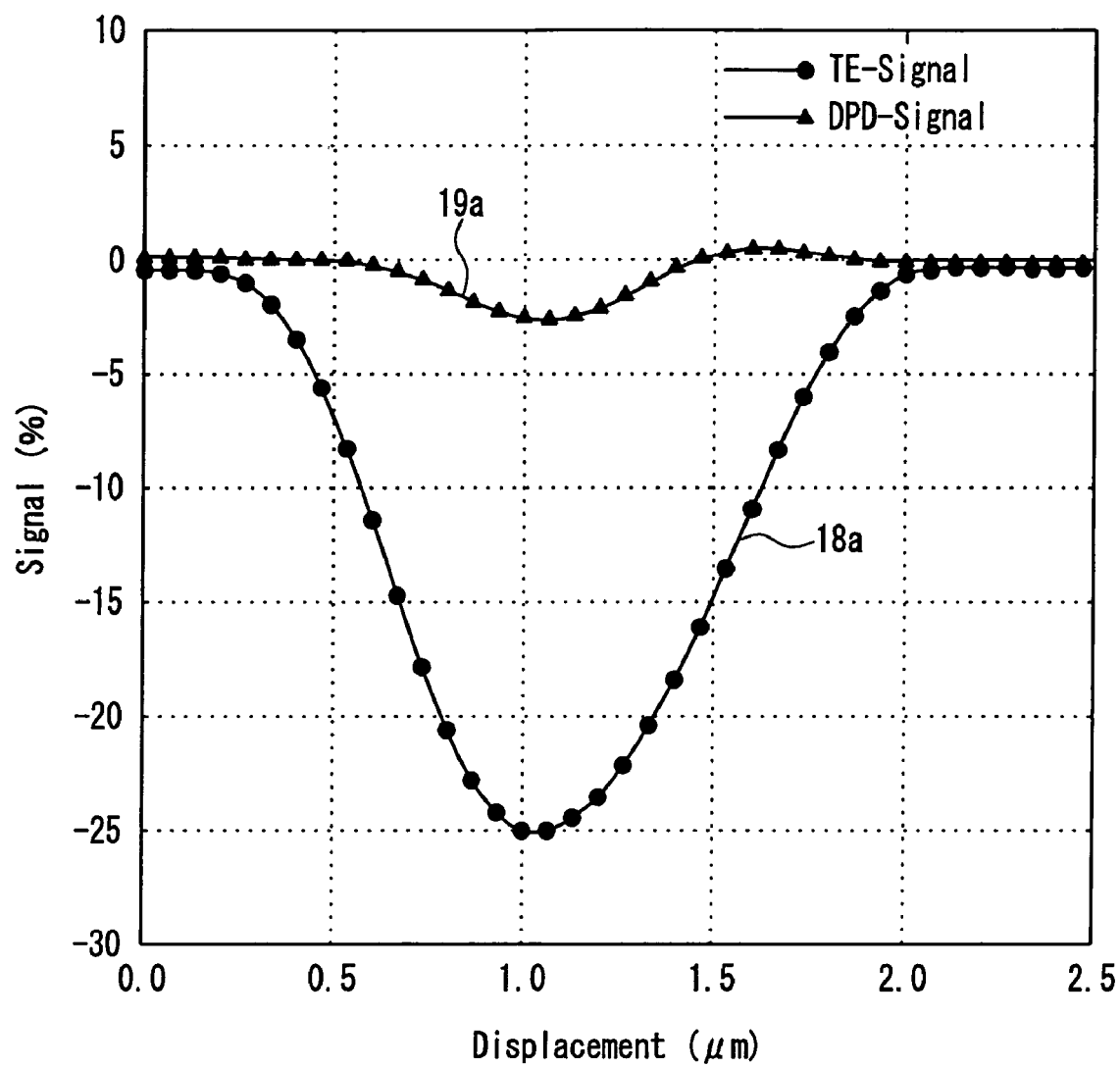
FIG. 6 shows an example of a DPD signal waveform and a TE signal waveform obtained when reproduction is performed with respect to a portion around an address signal pre-pit in an unrecorded region of the optical disk according to the second embodiment.

FIG. 5 is a plan view showing the shape of an address signal pre-pit of an optical disk according to the present embodiment. In FIG. 5, the address signal pre-pit 5A1 has the same height as the guide groove 5G and protrudes from the guide groove 5G toward the region of the land portion 5L on one side, with the amount of protrusion measured from the center line GC of the guide groove 5G being "a1". Furthermore, the region of the guide groove 5G where the address signal pre-pit 5A1 is formed is partially eroded so that the eroded portion has the same height as the land portion 5L, thereby forming groove eliminated regions 5C and 5D at which the guide groove 5G is eliminated. The presence of the groove eliminated region 5D is important in order to increase the amplitude of the DPD signal. The eliminated width (w/2+a3) of the groove eliminated region 5D is about the same as the width w of the guide groove 5G and the length b2 of the groove eliminated region 5D is, for example, at least 3T. It is to be noted here that it is not always necessary that the guide groove 5G be eliminated completely in the groove eliminated region 5D, and even if a portion of the guide groove 5G is left, the effect of the present embodiment can be achieved substantially when the size of the portion falls within a certain range. The width (w/2−a2) of the groove eliminated region 5C is not so great and is a fraction of the width w of the guide groove 5G, and the length b1 of the groove eliminated region 5C is, for example, about 3T. In the present embodiment, by arranging the pre-pit 5A1 with such a shape on a signal surface 5S of the optical disk in accordance with a predetermined rule, an address is assigned to the signal surface 5S.

When a focal spot 6S scans the guide grooves 5G, the DPD signal is affected by the presence of the address signal pre-pit 5A1. An example thereof is shown in FIG. 6. FIG. 6 shows a TE signal waveform 18*a* and a DPD signal waveform 19*a* obtained at a portion around the address signal pre-pit 5A1 in an unrecorded region. Note here that these waveforms are measured under the following conditions: the light source 1 has a wavelength $\lambda$ of 0.66 μm, the objective lens 4 has a NA of 0.62, the guide groove 5G and the pre-pit 5A1 have an optical depth d of $7\lambda/72$, the guide grooves 5G are arranged at a pitch p of 0.74 μm, the guide grooves 5G have a width w of 0.30 μm, the amount of protrusion a1 is 0.37 μm, the size a2 is 0.08 μm, the size a3 is 0.17 μm, the length b1 is 3T, the length b2 is 4T, and the length b3 is T. The clock frequency T corresponds to 0.133 μm.

A large amplitude is caused in the DPD signal waveform 19*a* by the address signal pre-pit 5A1. By detecting this amplitude waveform through the comparison with a certain slice level, it is possible to detect an address signal. Also, in the TE signal waveform 18*a*, a large amplitude is caused in the negative direction by the influence of the pre-pit. The reason why the amplitude is caused only in the negative direction is that the pre-pit 5A1 protrudes toward the land portion only on one side of the guide groove 5G.

Figure 7:
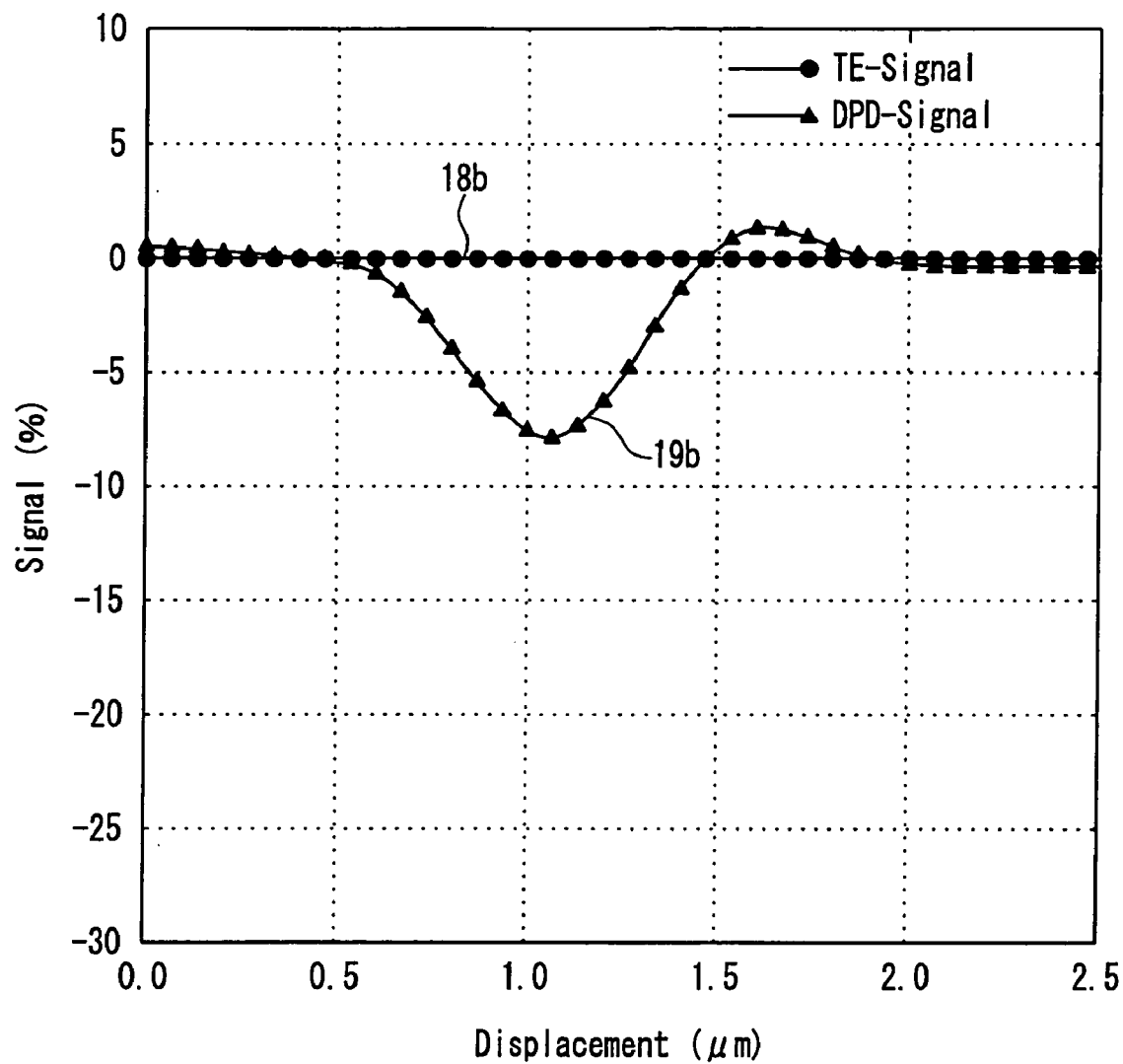
FIG. 7 shows an example of a DPD signal waveform and a TE signal waveform obtained when reproduction is performed with respect to a portion around an address signal pre-pit in a recorded region of the optical disk according to the second embodiment.

FIG. 7 shows a TE signal waveform 18*b* and a DPD signal waveform 19*b* obtained at a portion around the address signal pre-pit 5A1 in a recorded region. These waveforms correspond to those obtained when the optical depth d of the guide groove 5G and the pre-pit 5A1 becomes $\lambda/4$ by recording. As clear from FIG. 7, the TE signal waveform obtained after recording has substantially no amplitude regardless of the presence of the pre-pit, as in the case of the conventional example. In contrast, the DPD signal waveform 19*b* has a large amplitude, which in fact is larger than that obtained before recording (The physical cause of this phenomenon is as described above).

As described above, in the present embodiment, the DPD signal waveform 19*a* has a large amplitude in the unrecorded state and it tends to be increased further by recording. Accordingly, an error in reading an address signal is less liable to occur even after recording, not to mention before recording. Furthermore, the TE signal waveforms 18*a* and 18*b* obtained at a portion of the address pre-pit 5A1 of the optical disk according to the present embodiment are the same as those obtained in a conventional example. Therefore, if the pre-pit 5A1 is formed at the same position as that in a conventional optical disk, the optical disk of the present embodiment also can be used in a conventional optical disk apparatus that detects an address signal based on a TE signal alone. This brings about an advantage in that even an optical disk with a new pre-pit specification can have compatibility with an existing drive.

It is to be noted here that, instead of the above-described method in which an address signal of the optical disk is detected based on the DPD signals 19*a* and 19*b*, it is also possible to use a method that utilizes the fact that the TE signal 18*a* has a large amplitude before recording and that, even after recording, the TE signal 18*b* has large amplitude when a recording mark is formed so as not to lie over the address signal pre-pit 5A1. For example, the detection of an address signal can be carried out based on the TE signal 18a in an unrecorded region and based on the DPD signal 19b in the recorded region. Alternatively, the detection may be carried out using the TE signals 18a and 18b and the DPD signals 19a and 19b in both the unrecorded region and the recorded region and then the signals by which an address signal is detected may be selected.

In this case, instead of the TE signal or DPD signal, it is also possible to use a so-called two-channel DPD signal, or alternatively, it is possible to select any one of these signals depending on the situation and use the selected signal for the detection of an address signal, as in the first embodiment.

Third Embodiment

Hereinafter, a third embodiment of the present invention will be described with reference to FIGS. 8 and 9. The elements identical to those used in the first embodiment are described using the same numerals. An optical disk apparatus of the present embodiment is identical to that of the first embodiment except that the shape of an address signal pre-pit of an optical disk is different, and thus duplicate explanations will be omitted here. In the present embodiment, an address signal of the optical disk is detected based on a TE signal in an unrecorded region, whereas an address signal is detected based on either one of a TE signal and a DPD signal in a recorded region.

Figure 11:
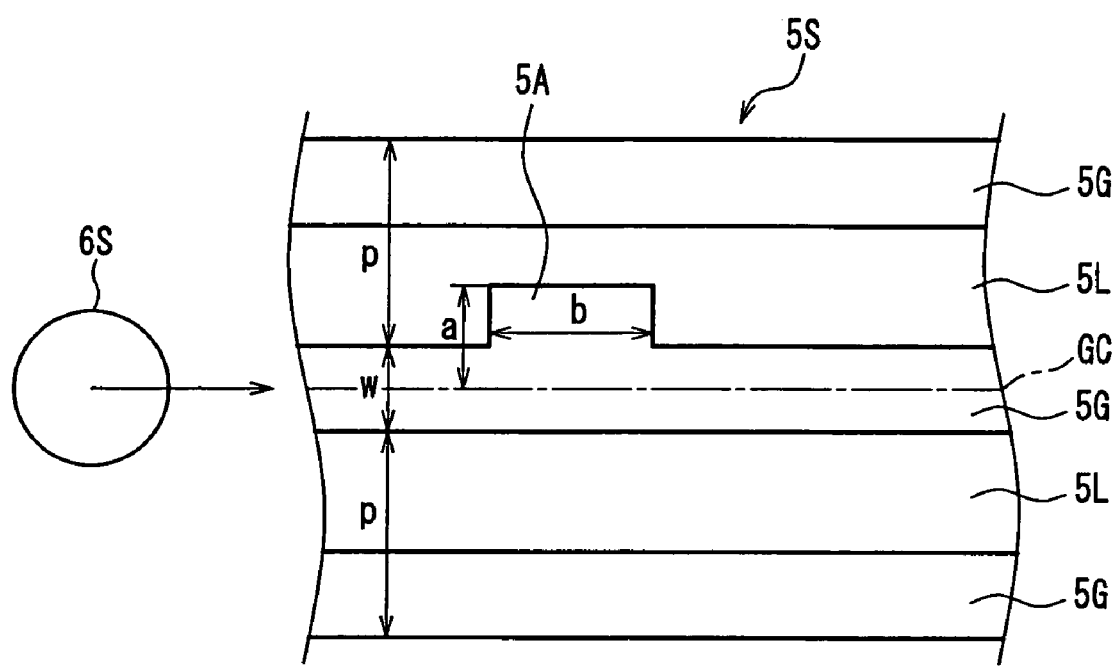
FIG. 11 is a plan view showing the shape of an address signal pre-pit in a conventional optical disk.
Figure 12:
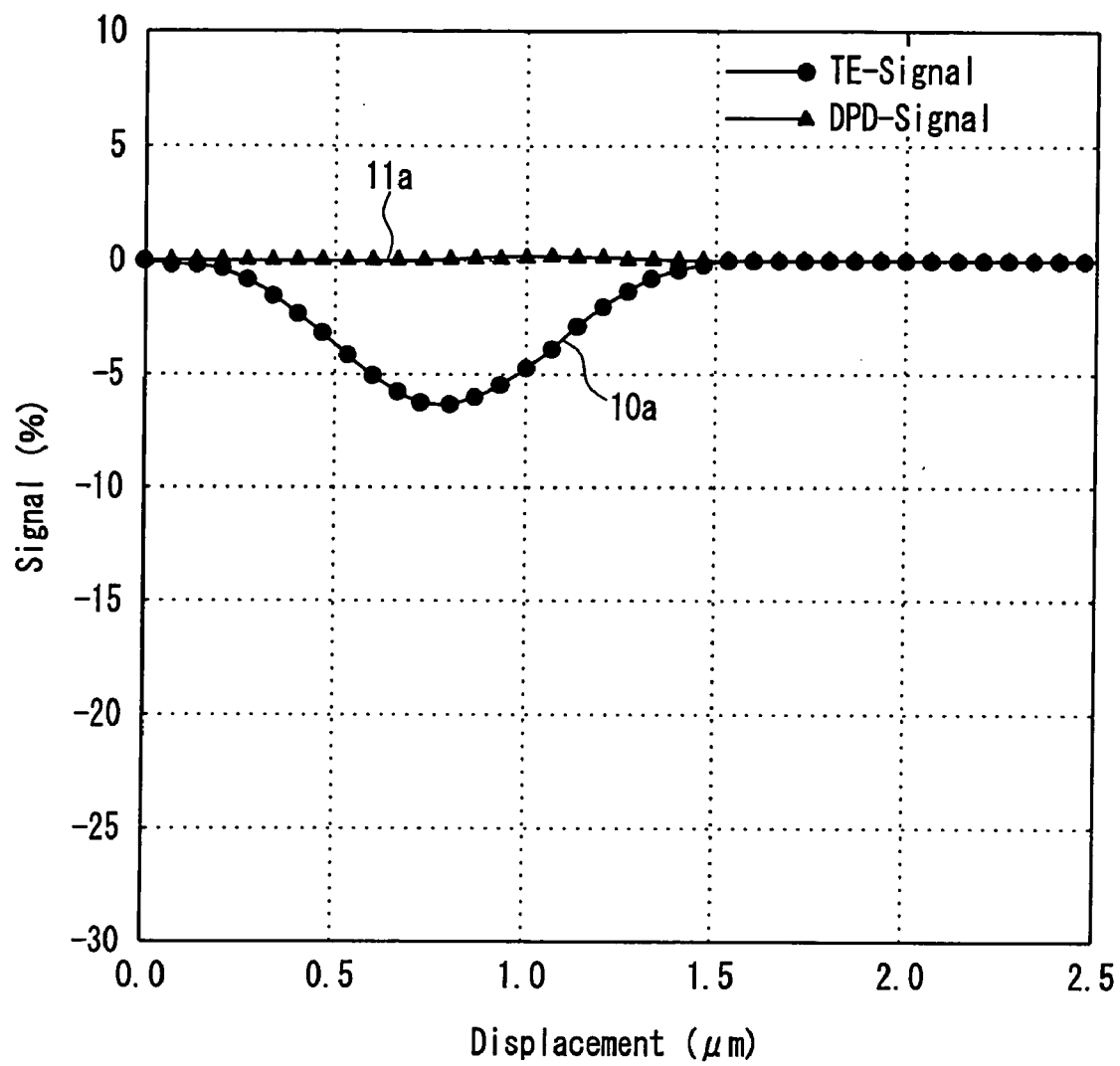
FIG. 12 shows an example of a DPD signal waveform and a TE signal waveform obtained when reproduction is performed with respect to a portion around an address signal pre-pit in an unrecorded region of the conventional optical disk.
Figure 13:
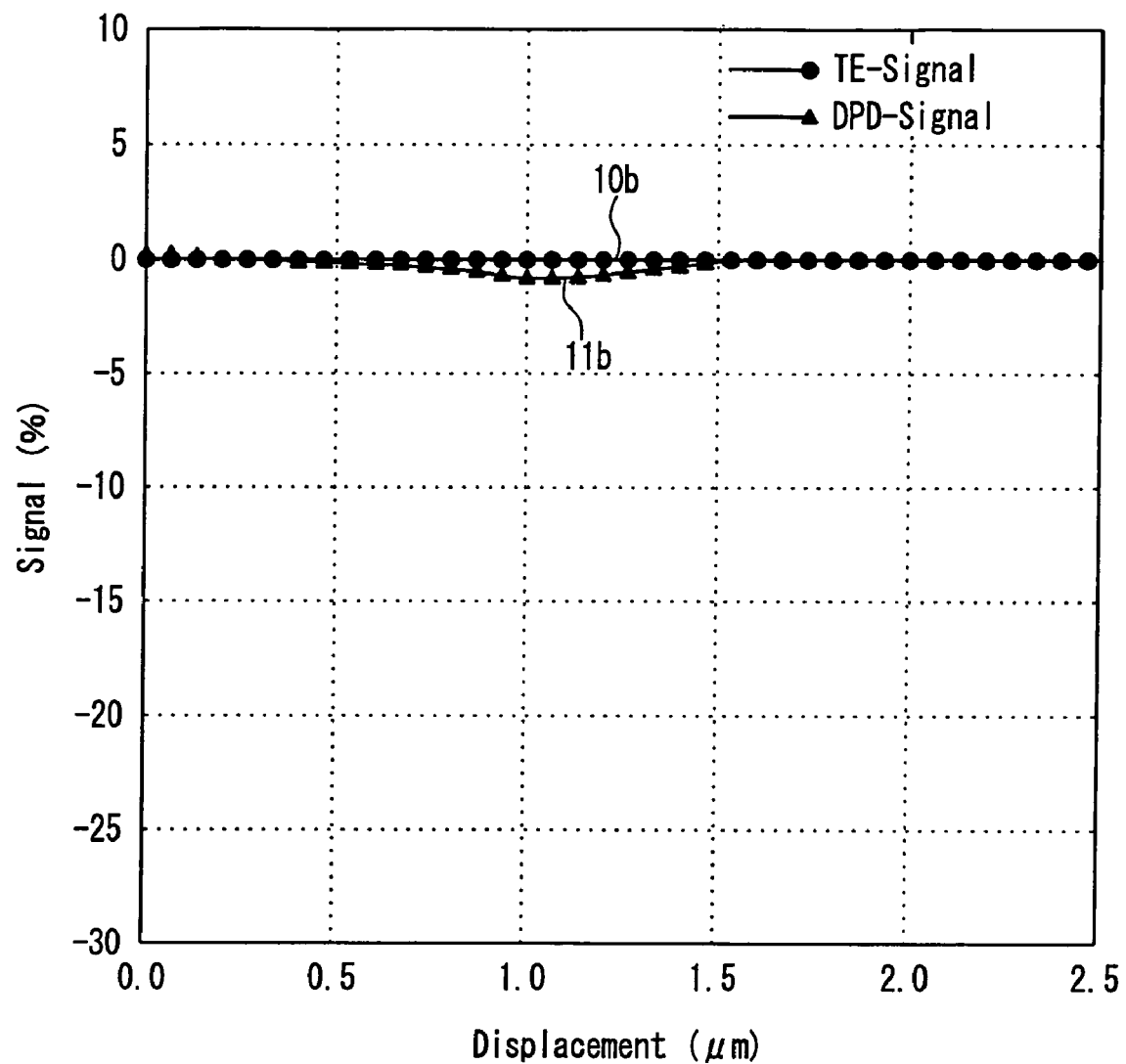
FIG. 13 shows an example of a DPD signal waveform and a TE signal waveform obtained when reproduction is performed with respect to a portion around an address signal pre-pit in a recorded region of the conventional optical disk.

An address signal pre-pit of the present embodiment has the same shape as that of the conventional example shown in FIG. 11, though the size thereof is different from that of the conventional example shown in FIG. 11. Thus, the address signal pre-pit of the present embodiment will be described with reference to FIG. 11. The address signal pre-pit 5A has the same height as the guide groove 5G and protrudes from the guide groove 5G toward the region of the land portion 5L on one side. By arranging this pre-pit 5A on a signal surface 5S of the optical disk in accordance with a predetermined rule, an address is assigned to the signal surface 5S. When a focal spot 6S scans the guide grooves 5G, the TE signal is affected by the presence of the address signal pre-pit 5A in an unrecorded state, whereas the TE signal or the DPD signal is affected by the presence of the address signal pre-pit 5A in a recorded state.

Figure 8:
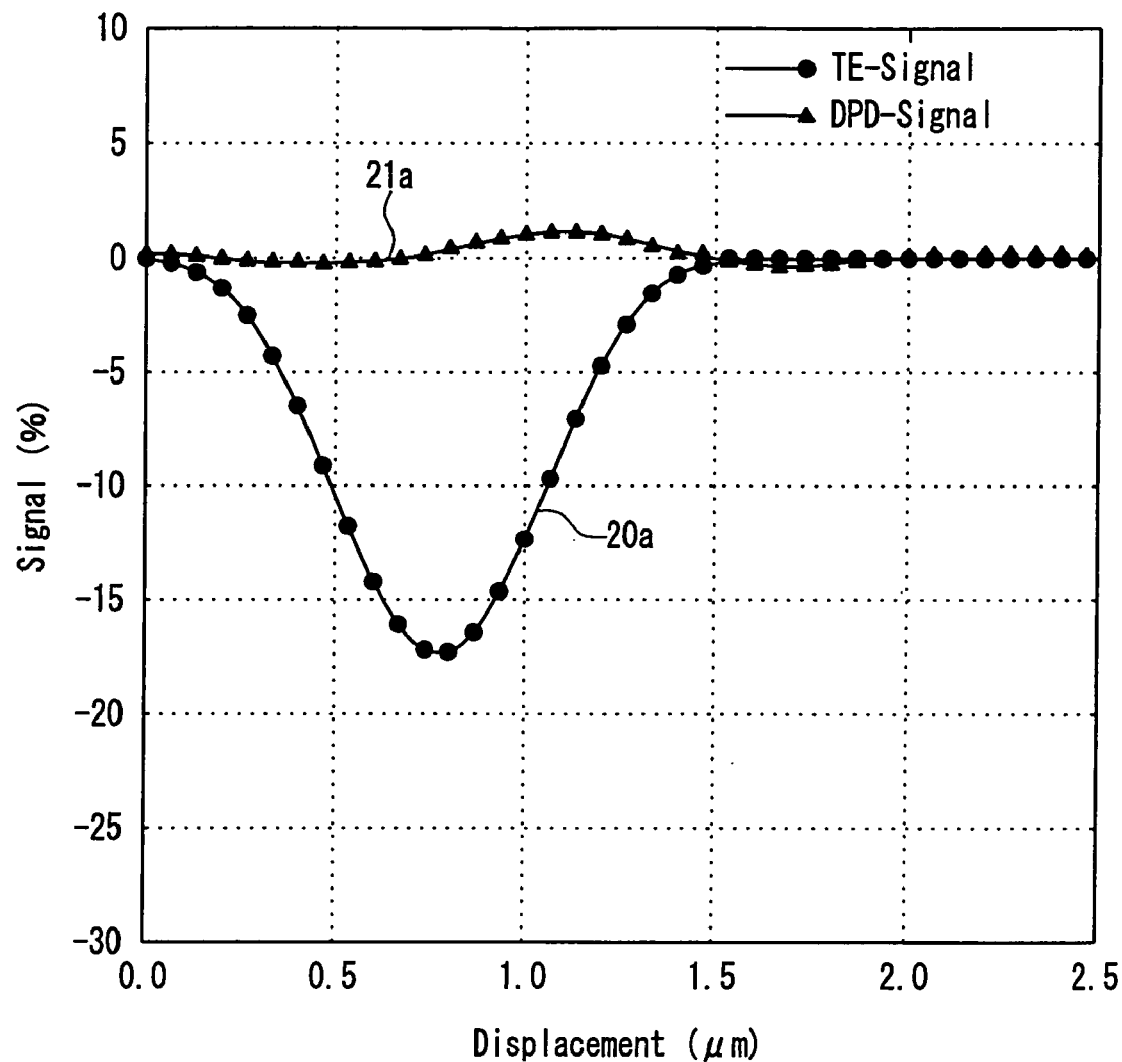
FIG. 8 shows an example of a DPD signal waveform and a TE signal waveform obtained when reproduction is performed with respect to a portion around an address signal pre-pit in an unrecorded region of an optical disk according to a third embodiment of the present invention.

FIG. 8 shows a TE signal waveform 20a and a DPD signal waveform 21a obtained at a portion around the address signal pre-pit 5A in an unrecorded region. Note here that these waveforms are measured under the following conditions: the light source 1 has a wavelength $\lambda$ of 0.66 µm, the objective lens 4 has a NA of 0.62, the guide groove 5G and the pre-pit 5A have an optical depth d of $7\lambda/72$, the guide grooves 5G are arranged at a pitch p of 0.74 µm, the guide grooves 5G have a width w of 0.30 µm, the amount of protrusion "a" is 0.37 µm, and the length "b" of the protruding portion is 4T. Note here that the clock frequency T corresponds to 0.133 µm. As described above, in the present embodiment, the amount of protrusion "a" is greater than that in the conventional example.

A large amplitude is caused in the TE signal waveform 20a by the address signal pre-pit 5A. By detecting this amplitude waveform through the comparison with a suitable slice level, it is possible to detect an address signal. As in the case of the conventional example, the DPD signal waveform 21a is not affected by the pre-pit 5A and thus has a small amplitude.

Figure 9:
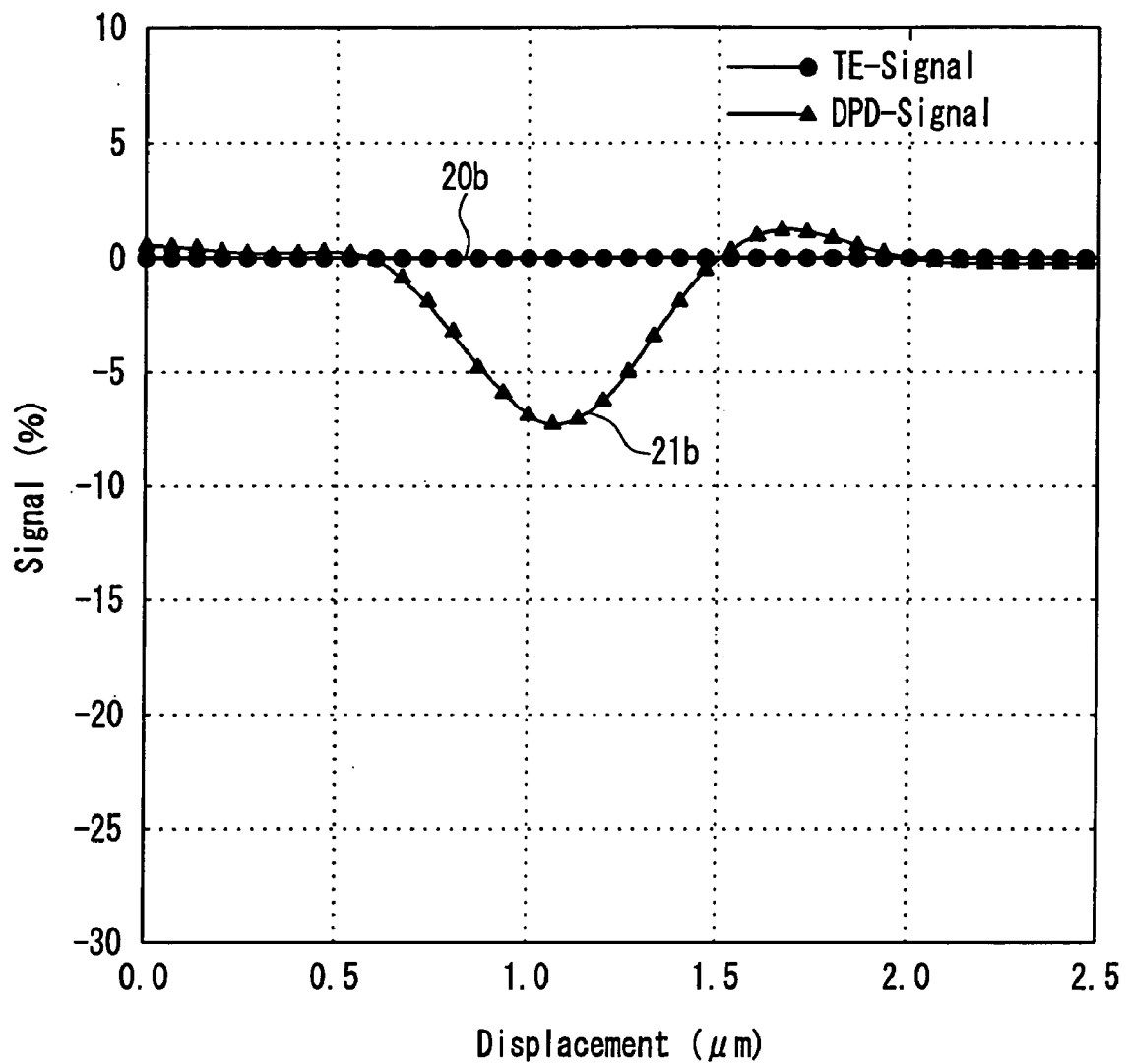
FIG. 9 shows an example of a DPD signal waveform and a TE signal waveform obtained when reproduction is performed with respect to a portion around an address signal pre-pit in a recorded region of the optical disk according to the third embodiment.

FIG. 9 shows a TE signal waveform 20b and a DPD signal waveform 21b obtained at a portion around the address signal pre-pit 5A in a recorded region. FIG. 9 shows the state where the optical depth d of the guide groove 5G and the pre-pit 5A becomes $\lambda/4$ by recording. As clear from FIG. 9, the TE signal waveform 20b obtained after recording has substantially no amplitude regardless of the presence of the pre-pit 5A, as in the case of the conventional example. In contrast, the amplitude of the DPD signal waveform 21b is increased significantly.

As described above, in the present embodiment, the TE signal waveform 20a has a large amplitude in an unrecorded region and the amplitude of the DPD signal waveform 21b tends to be increased significantly by recording. Accordingly, the detection of an address signal is carried out based on the TE signal waveform 20a in an unrecorded region, whereas in a recorded region the detection of an address signal is carried out based on the TE signal waveform 20b and the DPD signal waveform 21b and the signal waveform by which the address signal is detected is selected. This allows the occurrence of an error in reading an address signal to be inhibited even after recording, not to mention before recording.

Furthermore, in the present embodiment, the TE signal waveforms 20a and 20b obtained at the address pre-pit 5A of the optical disk are the same as those obtained in a conventional example. Therefore, if the pre-pits of the optical disk of the present embodiment are formed at the same positions as those in a conventional optical disk, the optical disk of the present embodiment also can be used in a conventional optical disk apparatus that detects an address signal based on a TE signal alone. This brings about an advantage in that the optical disk of the present embodiment can have compatibility with an existing drive.

In each of the above-described three embodiments, the pre-pit shape is represented by the figure surrounded by straight lines. However, it is to be noted here that the corners of the pre-pit may be rounded or the straight lines shown in the drawing may be replaced with curved lines so that the pre-pits have a shape similar to that shown in the drawing. Also, the pre-pit height near the boundary may be nonuniform. When each of the embodiments is thus modified, the same effect as described above still can be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk comprising:
   a substrate in a disk shape;
   guide grooves arranged at a pitch p in a radial direction of the substrate, each of the guide grooves being formed so as to extend in a circumferential direction of the substrate; and
   a pre-pit formed in a space between the guide grooves so as to extend along the guide groove,
   the optical disk being configured so that an address signal assigned to each location on a signal surface is indicated by arrangement of the pre-pit in accordance with a predetermined rule,
   wherein the pre-pit for each of the grooves is composed of a pair of pre-pits formed on respective sides of the guide groove, each of the pair of pre-pits being independent from a pre-pit provided on opposing sides of an adjacent guide groove so as to represent the address signal different from the address signal assigned to the adjacent guide groove, and the pair of pre-pits are arranged so as to be displaced from each other in the circumferential direction so that a distance between inner edges of the respective pre-pits in the circumferential direction is smaller than the pitch p of the guide grooves.

2. The optical disk according to claim 1, wherein an order in which one of the pair of pre-pits provided on one side of the guide groove and the other pre-pit provided on the other side of the guide groove are arranged in the circumferential direction forms a part of information of the address signal.

3. An optical disk comprising:

a substrate in a disk shape;

guide grooves arranged at a pitch p in a radial direction of the substrate, each of the guide grooves being formed so as to extend in a circumferential direction of the substrate; and a pre-pit formed in a space between the guide grooves so as to extend along the guide groove, the optical disk being configured so that an address signal assigned to each location on a recording surface is indicated by arrangement of the pre-pit in accordance with a predetermined rule, wherein the pre-pit for each one of the grooves is composed of a pair of pre-pits formed on respective sides of the guide groove, each of the pair of pre-pits being independent from a pre-pit provided on opposing sides of an adjacent guide groove so as to represent the address signal different from the address signal assigned to the adjacent guide groove, and one of the pair of pre-pits is composed of a groove eliminated region in which the guide groove is discontinued in a part of a region where the pre-pit is formed.

4. The optical disk according to claim 3, wherein an eliminated width that is a length of the groove eliminated region in the circumferential direction is at least 0.5 p.

5. An optical disk apparatus comprising:

a light source;

a photodetector having a plurality of light-receiving elements;

an optical system for focusing a light beam emitted from the light source on an optical disk and focusing reflected light from the optical disk on the photodetector;

a focus control unit for performing focus control with respect to the light beam based on an output from the photodetector;

a tracking control unit for performing tracking control with respect to the light beam based on the output from the photodetector; and an address detection unit for detecting an address signal assigned to each location on a signal surface of the optical disk in the output from the photodetector, the optical disk apparatus being configured so that the optical disk according to claim 1 is loaded, and the address detection unit detects the address signal in the output from the photodetector that is based on the pre-pit formed on the optical disk, wherein, assuming that four regions A, B, C, and D are defined by straight lines that respectively extend in a radial direction and a circumferential direction of the optical disk and are arranged clockwise in this order with the straight line between the regions A and B extending in the circumferential direction, light beams corresponding to the respective regions A, B, C, and D in the reflected light from of the optical disk are projected on the plurality of light-receiving elements of the photodetector separately, thereby generating detection signals a, b, c, and d, respectively, and a DPD signal given by $\{(a+c)-(b+d)\}$ is used to detect the address signal.

6. An optical disk apparatus comprising:

a light source;

a photodetector having a plurality of light-receiving elements;

an optical system for focusing a light beam emitted from the light source on an optical disk and focusing reflected light from the optical disk on the photodetector;

a focus control unit for performing focus control with respect to the light beam based on an output from the photodetector;

a tracking control unit for performing tracking control with respect to the light beam based on the output from the photodetector; and an address detection unit for detecting an address signal assigned to each location on a signal surface of the optical disk in the output from the photodetector, the optical disk apparatus being configured so that the optical disk according to claim 1 is loaded, and the address detection unit detects the address signal in the output from the photodetector that is based on the pre-pit formed on the optical disk, wherein, assuming that four regions A, B, C, and D are defined by straight lines that respectively extend in a radial direction and a circumferential direction of the optical disk and are arranged clockwise in this order with the straight line between the regions A and B extending in the circumferential direction, light beams corresponding to the respective regions A, B, C, and D in the reflected light from the optical disk are projected on the plurality of light-receiving elements of the photodetector separately, thereby generating detection signals a, b, c, and d, respectively, and one of a TE signal given by $\{(a+d)-(b+c)\}$ and a DPD signal given by $\{(a+c)-(b+d)\}$ is selected depending on a detection situation and is used to detect the address signal.

7. The optical disk apparatus according to claim 6, wherein when the optical disk is in an unrecorded state, the TE signal is used to detect the address signal, and when the optical disk is in a recorded state, a signal having a better signal quality is selected from the TE signal and the DPD signal, said signal having the better signal quality being used to detect the address signal 8. An optical disk apparatus comprising:

a light source;

a photodetector having a plurality of light-receiving elements;

an optical system for focusing a light beam emitted from the light source on an optical disk and focusing reflected light from the optical disk on the photodetector;

a focus control unit for performing focus control with respect to the light beam based on an output from the photodetector;

a tracking control unit for performing tracking control with respect to the light beam based on the output from the photodetector, and an address detection unit for detecting an address signal assigned to each location on a signal surface of the optical disk in the output from the photodetector, the optical disk apparatus being configured so that the optical disk according to claim 1 is loaded, and the address detection unit detects the address signal in the output from the photodetector that is based on the pre-pit formed on the optical disk, wherein, assuming that four regions A, B, C, and D are defined by straight lines that respectively extend in a radial direction and a circumferential direction of the optical disk and are arranged clockwise in this order with the straight line between the regions A and B extending in the circumferential direction, light beams corresponding to the respective regions A, B, C, and D in the reflected light from the optical disk are projected on the plurality of light-receiving elements of the photodetector separately, thereby generating detection signals a, b, c, and d, respectively, and one of a TE signal given by $\{(a+d)-(b+c)\}$, a DPD signal given by $\{(a+c)-(b+d)\}$, and a 2ch-DPD signal given by $(a-b)$ or $(c-d)$ is selected depending on a detection situation and is used to detect the address signal.

9. The optical disk apparatus according to claim 8, wherein when the optical disk is in an unrecorded state, the TE signal is used to detect the address signal, and when the optical disk is in a recorded state, a signal having the best signal quality is selected from the TE signal, the DPD signal, and the 2ch-DPD signal and is used to detect the address signal.

\* \* \* \* \*